(12) United States Patent
Rosenthal et al.

(10) Patent No.: US 11,171,461 B2
(45) Date of Patent: *Nov. 9, 2021

(54) WAVELENGTH DISCRIMINATING SLAB LASER

(71) Applicant: Rofin-Sinar Laser GmbH, Hamburg (DE)

(72) Inventors: Peter Rosenthal, West Simsbury, CT (US); Jens Schüttler, Hamburg (DE); Florian Engel, Hamburg (DE); Gongxue Hua, Unionville, CT (US)

(73) Assignee: ROFIN-SINAR LASER GMBH, Hamburg (DE)

(*) Notice: Subject to any disclaimer, the term of this patent is extended or adjusted under 35 U.S.C. 154(b) by 185 days.

This patent is subject to a terminal disclaimer.

(21) Appl. No.: 16/674,544

(22) Filed: Nov. 5, 2019

(65) Prior Publication Data

US 2020/0067256 A1 Feb. 27, 2020

Related U.S. Application Data

(63) Continuation of application No. 15/697,343, filed on Sep. 6, 2017, now Pat. No. 10,505,331.

(30) Foreign Application Priority Data

Sep. 7, 2016 (DE) ...................... 10 2016 116 779.7

(51) Int. Cl.
*H01S 3/03* (2006.01)
*H01S 3/08* (2006.01)
(Continued)

(52) U.S. Cl.
CPC ............ *H01S 3/0315* (2013.01); *H01S 3/063* (2013.01); *H01S 3/0606* (2013.01); *H01S 3/082* (2013.01);
(Continued)

(58) Field of Classification Search
CPC ............ H01S 3/08059; H01S 3/08068; H01S 3/08081
See application file for complete search history.

(56) References Cited

U.S. PATENT DOCUMENTS

| 4,769,614 A | 9/1988 | Oughstun |
| 4,903,271 A | 2/1990 | Yasui et al. |

(Continued)

FOREIGN PATENT DOCUMENTS

| CN | 102163788 A | 8/2011 |
| CN | 103189769 A | 7/2013 |

(Continued)

OTHER PUBLICATIONS

International Preliminary Report on Patentability received for PCT Patent Application No. PCT/EP2017/067721, dated Mar. 21, 2019, 16 pages (8 pages of English Translation and 8 pages of Official Copy).

(Continued)

*Primary Examiner* — Minsun O Harvey
*Assistant Examiner* — Sean P Hagan
(74) *Attorney, Agent, or Firm* — Morrison & Foerster LLP

(57) ABSTRACT

A $CO_2$ laser that generates laser-radiation in just one emission band of a $CO_2$ gas-mixture has resonator mirrors that form an unstable resonator and at least one spectrally-selective element located on the optical axis of the resonator. The spectrally-selective element may be in the form of one or more protruding or recessed surfaces. Spectral-selectivity is enhanced by forming a stable resonator along the optical axis that includes the spectrally-selective element. The $CO_2$ laser is tunable between emission bands by translating the spectrally-selective element along the optical axis.

26 Claims, 10 Drawing Sheets

(51) Int. Cl.
*H01S 3/082* (2006.01)
*H01S 3/223* (2006.01)
*H01S 3/06* (2006.01)
*H01S 3/063* (2006.01)
*H01S 3/081* (2006.01)
*H01S 3/105* (2006.01)

(52) U.S. Cl.
CPC ...... *H01S 3/08004* (2013.01); *H01S 3/08022* (2013.01); *H01S 3/08068* (2013.01); *H01S 3/08081* (2013.01); *H01S 3/2232* (2013.01); *H01S 3/0818* (2013.01); *H01S 3/1053* (2013.01)

(56) References Cited

U.S. PATENT DOCUMENTS

| | | | | |
|---|---|---|---|---|
| 4,942,588 | A * | 7/1990 | Yasui | H01S 3/034 372/103 |
| 5,012,483 | A * | 4/1991 | Reintjes | H01S 3/0818 372/101 |
| 5,058,123 | A * | 10/1991 | Yasui | H01S 3/08081 372/99 |
| 5,327,449 | A * | 7/1994 | Du | H01S 3/08081 372/108 |
| 5,412,681 | A | 5/1995 | Eisel et al. | |
| 8,331,416 | B2 | 12/2012 | Hage et al. | |
| 2012/0250706 | A1 | 10/2012 | Stiens et al. | |
| 2014/0294033 | A1 | 10/2014 | Zhu et al. | |
| 2014/0294034 | A1 | 10/2014 | Zhu et al. | |

FOREIGN PATENT DOCUMENTS

| | | | |
|---|---|---|---|
| CN | 103904536 A | 7/2014 | |
| CN | 103904539 A | 7/2014 | |
| WO | 2011/154272 A1 | 12/2011 | |
| WO | 2012/020408 A1 | 2/2012 | |
| WO | WO-2018046171 A1 * | 3/2018 | ........... H01S 3/0315 |

OTHER PUBLICATIONS

International Preliminary Report on Patentability received for PCT Patent Application No. PCT/EP2017/072464, dated Mar. 21, 2019, 10 pages.
Decision to Grant Received for European Patent Application No. 17762127.3, dated Jul. 9, 2020, 2 pages.
Intention to Grant Received for European Patent Application No. 17762127.3, dated Mar. 26, 2020, 8 pages.
Office Action received for Chinese Patent Application No. 201780055084.0, dated Aug. 25, 2020, 21 pages (10 pages of English Translation and 11 pages of Official Copy).
Office Action received for Chinese Patent Application No. 201780055082.1, dated Apr. 9, 2021, 7 pages (4 pages of English Translation and 3 pages of Official Copy).
Office Action received for Korean Patent Application No. 10-2019-7009806, dated May 14, 2021, 13 pages (7 pages of English Translation and 6 pages of Official Copy).
Office Action received for Taiwanese Patent Application No. 106128528, dated Mar. 31, 2021, 5 pages (3 pages of English Translation and 2 pages of Official Copy).
Epishin et al., "Pulsed Tea C02 Laser with a Simple Selective Reflector", Optics & Spectroscopy, vol. 66, No. 4, Apr. 1989, pp. 502-505.
Final Office Action received for U.S. Appl. No. 15/697,343, dated Feb. 25, 2019, 24 pages.
International Search Report and Written Opinion Received for PCT Application No. PCT/EP2017/072464, dated Oct. 26, 2017, 14 pages.
International Search Report received for PCT Patent Application No. PCT/EP2017/067721, dated Oct. 26, 2017, 6 pages.
International Written Opinion received for PCT Patent Application No. PCT/EP2017/067721, dated Oct. 26, 2017, 7 pages.
Non-Final Office Action received for U.S. Appl. No. 15/697,343, dated Jul. 10, 2018, 26 pages.
Notice of Allowance received for U.S. Appl. No. 15/697,343, dated Aug. 19, 2019, 5 pages.
Office Action received for German Patent Application No. 102016116779.7, dated Jul. 17, 2018, 5 pages.
Office Action received for Chinese Patent Application No. 201780055082.1, dated Aug. 20, 2020, 20 pages (10 pages of English Translation and 10 pages of Official Copy).

* cited by examiner

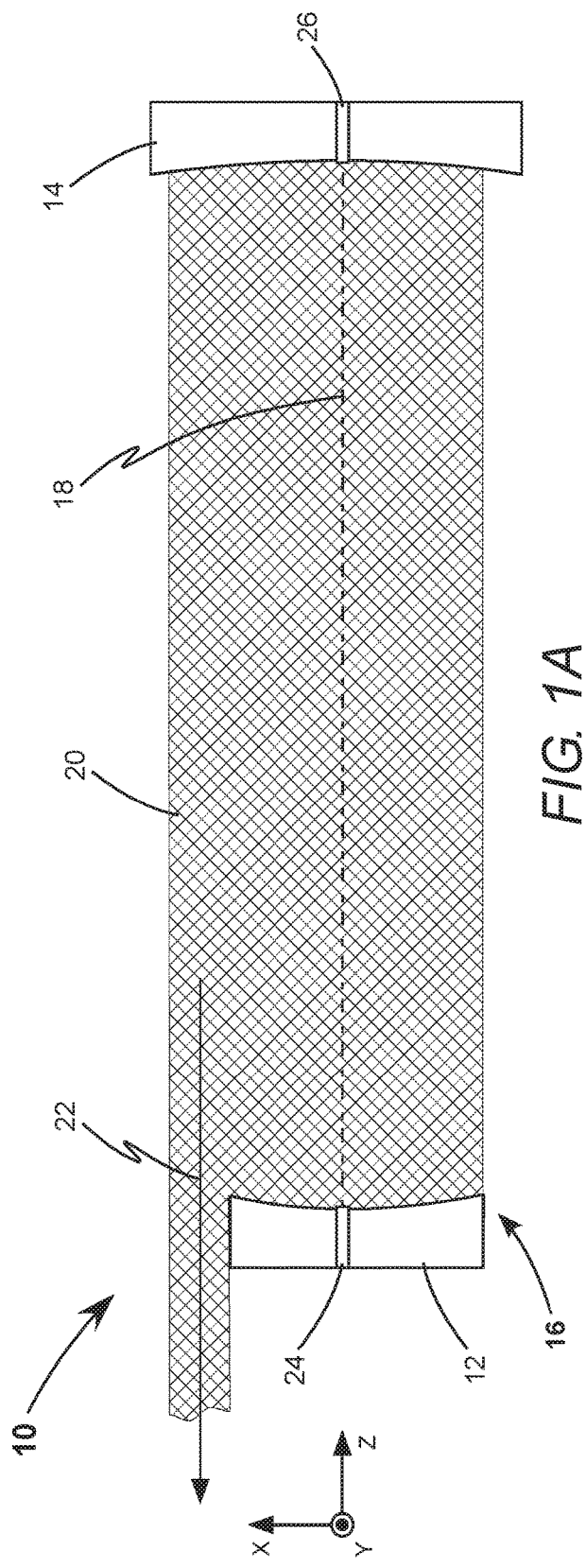
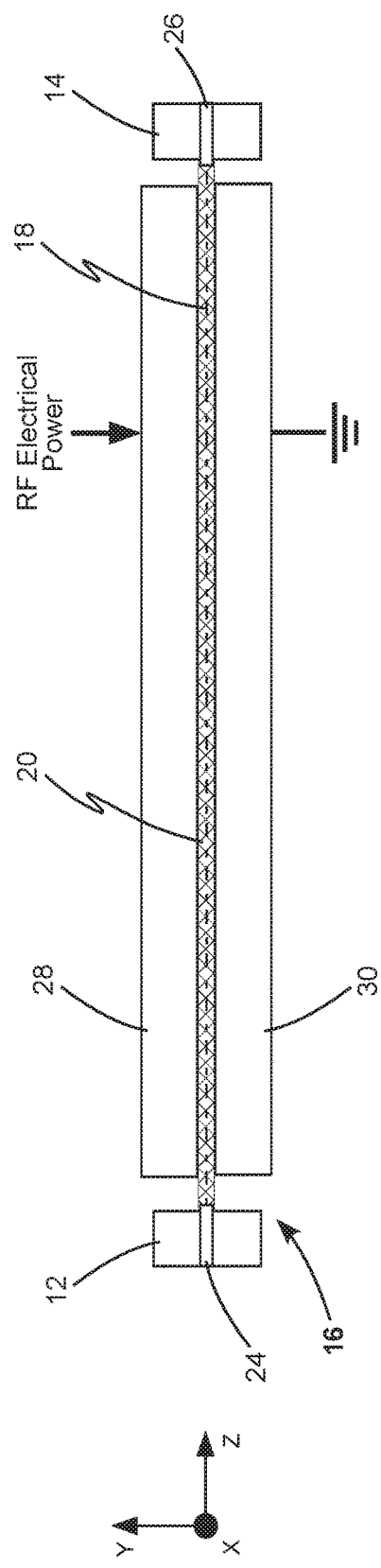
FIG. 1A
FIG. 1B

WAVELENGTH DISCRIMINATING SLAB LASER

PRIORITY

This application is a continuation of U.S. patent Ser. No. 15/697,343, filed Sep. 6, 2017, which in turn claims priority to German Patent Application No. 10 2016 116 779.7, filed on 7 Sep. 2016, the entire disclosures of which are incorporated herein by reference.

TECHNICAL FIELD OF THE INVENTION

The present invention relates in general to controlling the spectral output of lasers. It relates in particular to selecting an emission band of a gain-medium in a laser having an unstable resonator.

DISCUSSION OF BACKGROUND ART

Carbon dioxide ($CO_2$) and carbon monoxide (CO) lasers use transitions between molecular vibrational and rotational states in an excited gas mixture to produce infrared laser-radiation. In a $CO_2$ laser, the gas mixture includes $CO_2$, helium (He), nitrogen ($N_2$), and usually smaller concentrations hydrogen ($H_2$). The gas mixture is energized (pumped) by applying an electric current or a radio-frequency (RF) field between two electrodes. RF pumping has an advantage of longer electrode lifetime. Excited $CO_2$ gas mixtures can emit laser-radiation over a plurality of wavelength ranges (bands), which are centered around 9.3 micrometers ($\mu m$), 9.6 $\mu m$, 10.2 $\mu m$, and 10.6 $\mu m$.

In a slab configuration, the gas mixture is energized in a volume between flat wave-guiding surfaces of two closely-spaced electrodes. A laser-resonator is formed around the energized gas mixture by two resonator mirrors, known by practitioners of the art as an "output coupler" or "front mirror" and a "high-reflector" or "rear mirror". The gas mixture occupies a volume defined in height by the small gap between the electrodes, in length by the distance between the resonator mirrors, and in width by the breadth of the resonator mirrors. In diffusion-cooled configurations, the gas mixture is cooled by heat diffusing to the electrodes, which typically include channels containing a flowing liquid coolant. In fast-flow configurations, cooling is achieved by rapidly circulating the gas mixture in a circuit that includes a gas reservoir, the laser-resonator, and a heat exchanger.

In a slab configuration, the resonator mirrors typically form an unstable laser-resonator. Spontaneously emitted radiation, directed by the resonator mirrors, is amplified by stimulated emission during multiple passes through the energized gas mixture. Output laser-radiation exits the laser-resonator after a final reflection from the high-reflector as an approximately collimated beam, passing through a hole in the output coupler or passing by an outside edge of the output coupler. The hole or edge region through which the beam passes is sealed gas-tight by a transparent window.

$CO_2$ lasers are used primarily for industrial material processing, particularly for cutting, scribing, marking, and welding. Cutting materials such as plastic and wood typically requires tens to hundreds of Watts of power, while cutting and welding metals and metal alloys typically requires kilo-Watts of power, depending on the thickness of the workpiece. The emission band preferred in a specific application depends on the absorption spectrum of the material being processed. For example, the 10.2 $\mu m$ band is preferred for cutting some types of plastic, while the 9.3 $\mu m$ band was shown to be preferable for ablation of hard tissue in dental procedures.

Generally, the resonator mirrors in a $CO_2$ laser have a metal surface, which is most commonly copper, or a broad-band coating that is reflective at all emission bands between 9 $\mu m$ and 11 $\mu m$. $CO_2$ lasers tend to operate in the dominant 10.6 $\mu m$ band. It is challenging to generate laser-radiation purely in one emission band, without any spurious emission in one of the other emission bands. It is particularly challenging to generate laser-radiation purely in the 9.3 $\mu m$ band or 9.6 $\mu m$ band, which have smaller emission cross-sections.

To generate laser-radiation in just one emission band, at least one resonator mirror may be coated with a band-selective coating, which is highly reflective for the selected emission band and is weakly reflective for the other emission bands. Lasing of the other emission bands is thereby suppressed. Such band-selective coatings are thicker than broadband coatings, having many quarter-wavelength thick layers made of dielectric materials. Mirror designs are optimized for the required spectral selectivity, but such thick coatings are prone to particle-induced optical damage due to the comparatively low thermal conductivity of the dielectric materials. Localized heating caused by absorption of laser-radiation by a particle on the coating surface can induce catastrophic damage. Such thick coatings, having different thermal expansion characteristics from underlying substrate materials, are also prone to delamination. Another disadvantage of band-selective coating is high cost compared to simpler broadband coatings.

It is known that the longer wavelength 10.2 $\mu m$ and 10.6 $\mu m$ bands can be suppressed by applying a passivation layer of $SiO_2$ to the flat wave-guiding surface of at least one of the electrodes and precisely setting the distance between the electrodes. Such an arrangement is described in U.S. Pat. No. 8,331,416 and can be made to generate laser-radiation in the 9.3 $\mu m$ band, but does not provide stable operation in just the 9.6 $\mu m$ band or 10.2 $\mu m$ band.

There is need for a high-power $CO_2$ laser reliably producing laser-radiation in just one selected emission band, which is cost-effective to manufacture and not prone to optical damage. Preferably, such a $CO_2$ laser would be capable of producing laser-radiation purely in any one of the emission bands between 9 $\mu m$ and 11 $\mu m$, with the output emission band selectable during manufacture or operation thereof.

SUMMARY OF THE INVENTION

In one aspect, laser apparatus in accordance with the present invention comprises a gain-medium that has a plurality of emission bands. First and second resonator mirrors are provided. Each resonator mirror has a reflective surface. The resonator mirrors are arranged around the gain-medium to form an unstable laser-resonator, which has an optical axis. At least one of the resonator mirrors includes a spectrally-selective element, which occupies a less than 30% portion of the reflective surface of the at-least one resonator mirror. The spectrally-selective element is located on the optical axis. The spectrally-selective element has a reflection loss of less than about 4% for a desired emission band and a reflection loss of greater than 10% for other emission bands. Energizing the gain-medium produces laser-radiation from the unstable laser-resonator that has higher power in the desired emission band than in the other emission bands.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1A is a plan view, in cross-section, schematically illustrating a preferred embodiment of laser apparatus in accordance with the present invention, for generating laser-radiation in a desired emission band of a gain-medium, comprising two-resonator mirrors forming an unstable laser-resonator having an optical axis, and two spectrally-selective elements inserted into the resonator mirrors and located on the optical axis.

FIG. 1B is a side view, in cross-section, schematically illustrating the laser apparatus of FIG. 1A.

DETAILED DESCRIPTION OF THE INVENTION

Figure 1C:
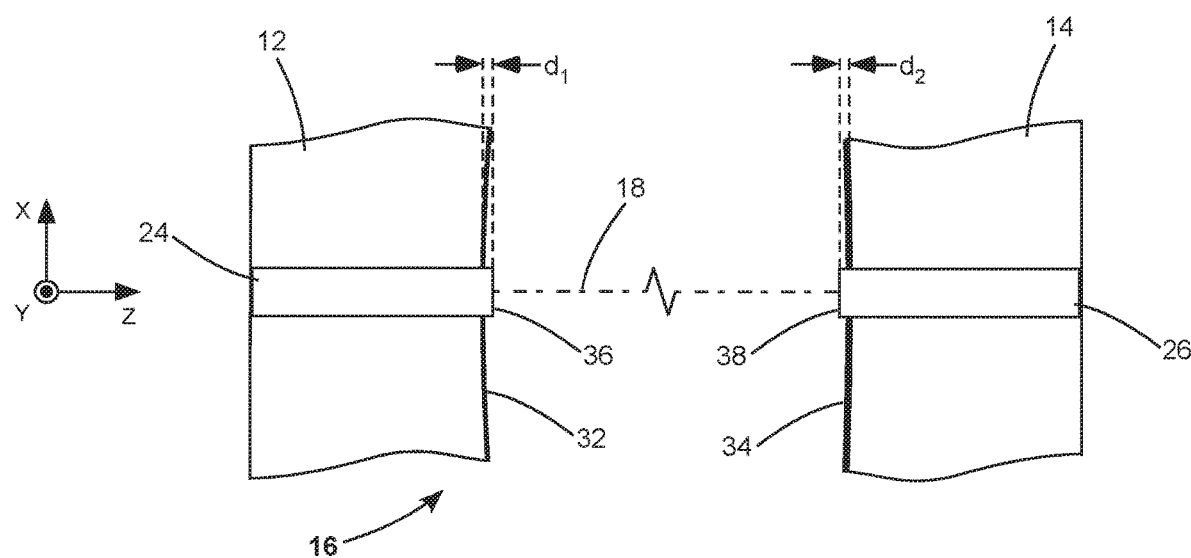
FIG. 1C is a plan view, in cross-section, schematically illustrating additional details of the laser apparatus of FIG. 1A.

Referring now to the drawings, wherein like features are designated by like numerals, FIG. 1A is a plan view, in cross-section, schematically illustrating one preferred embodiment 10 of laser apparatus in accordance with the present invention. Laser 10 comprises a left resonator mirror 12 and a right resonator mirror 14, which cooperatively form a laser-resonator 16 having an optical axis 18. Hatching depicts laser-radiation 20, which is amplified by stimulated emission in an excited gaseous gain-medium and exits the laser-resonator along an output beam path 22. In plane XZ, the laser-resonator is unstable, wherein any beam being amplified follows a serpentine path and increases in size until it leaks out therefrom as a collimated beam of laser-radiation. The gain-medium has a plurality of emission bands capable of amplification by stimulated emission.

Left resonator mirror 12 (which is an output coupler mirror) includes a left spectrally-selective element 24. Right resonator mirror 14 (which is a high-reflector mirror) includes a right spectrally-selective element 26. Spectrally-selective elements 24 and 26 are located on optical axis 18. Each one of the spectrally-selective elements creates a low reflection loss for a desired emission band of the gain-medium and a high reflection loss for other emission bands. Herein, "low reflection loss" means a loss of less than about 4%, or equivalently a reflectivity of greater than about 96%. "High reflection loss" means a loss of greater than about 10%, or equivalently a reflectivity of less than about 90%.

FIG. 1B is a side view, in cross-section, of laser 10 in another plane that includes optical axis 18. Electrode 28 and electrode 30 together form a waveguide for laser-radiation 16 in plane YZ. Although resonator mirrors 12 and 14 are depicted as flat in plane YZ, they may instead have a slight concave shape to direct reflected laser-radiation back into the waveguide with minimal diffraction loss. In plane YZ, the laser-resonator is effectively stable, wherein any beam being amplified makes a plurality of reciprocal passes along a beam path defined by the waveguide.

The gain-medium fills the whole volume between the two resonator mirrors and electrodes 28 and 30. Electrical power at RF frequencies is generated by a source thereof and is applied across the electrodes to create an RF field between the electrodes that energizes the gain-medium. The source of RF electrical power, the gain-medium, elements for forced circulation of the gain-medium, and elements for cooling the gain-medium are not depicted in FIGS. 1A and 1B for convenience of illustration. Sources of RF electrical power, means for forced circulation, and means of cooling the gain-medium are all well known in the art. A description thereof is not necessary for understanding the principles of the present invention.

Spectrally-selective elements 24 and 26 respectively occupy a relatively small portion of the surface area of resonator mirrors 12 and 14 illuminated by laser-radiation 20. The small portion is less than 30%, preferably less than 15%, and most preferably less than 5%. In plane YZ, illumination of the resonator mirrors substantially overlaps the spectrally-selective elements, while in plane XZ just a fraction of the illumination is incident on the spectrally-selective elements. The diameter of the spectrally selective element is preferably only a few millimeters or even in the submillimeter range. Examples discussed below include structures that are 4 millimeters in diameter and in one example, the spectrally selective element is 0.87 mm in diameter.

FIG. 1C is plan view, in cross-section, showing additional detail of laser-resonator 16. Optical axis 18 is foreshortened in the drawing for convenience of illustration. Surfaces 32 and 34 of resonator mirrors 12 and 14, respectively, have high reflectivity for the desired emission band and may also be reflective for other emission bands of the gain-medium. Spectrally-selective elements 24 and 26 are inserted into resonator mirrors 12 and 14, respectively, and protrude from surfaces 32 and 34 by distances $d_1$ and $d_2$. Spectrally-selective elements 24 and 26, respectively, have surfaces 36 and 38. For manufacturing convenience, surfaces 36 and 38 may be made of the same materials as surfaces 32 and 34, but whatever material or coating is selected must be reflective for the desired emission band.

Distances $d_1$ and $d_2$ are each about equal to a half-integer of the center wavelength of the desired emission band, such that there is constructive interference between laser-radiation reflected from surfaces 32 and 36 and also from surfaces 34 and 38. For radiation in other emission bands, specular reflections from surfaces 32 and 36 and also from surfaces 34 and 38 would be out of phase, thereby preventing amplification to coherent laser-radiation. Effectively, for other emission bands, surfaces 36 and 38 appear as high-loss holes in resonator mirrors 12 and 14. In contrast, for the desired emission band, the resonator mirrors have contiguously low reflection loss. Spectral selectivity can also be achieved by recessing surfaces 36 and 38 from surfaces 32 and 34, without departing from the spirit and scope of the present invention. Herein, such recessed spectrally-selective elements have negative distances $d_1$ and $d_2$.

By way of example, laser 10 has a gain-medium that includes $CO_2$ gas, which has emission bands at center wavelengths of about 9.3 µm, 9.6 µm, 10.2 µm, and 10.6 µm. Electrodes 28 and 30 are separated by about 2 millimeters (mm). Left resonator mirror 12 has a width of about 170 mm and right resonator mirror 14 has a width of about 190 mm. Left resonator mirror 12 has a focal length of about 470 mm and right resonator mirror 14 has a focal length of about 530 mm. The resonator mirrors are separated by about 1000 mm.

Exemplary spectrally-selective elements 24 and 26 are cylindrical in shape and have a diameter of about 4 mm. Surfaces 32, 34, 36, and 38 have high reflectivity for all four emission bands. The surfaces could be made of a metal, such as gold, silver, copper, chromium, or nickel. Alternatively, the surfaces could be overlaid with a broad bandwidth coating made of quarter-wavelength layers of dielectric materials. The desired emission band for the output laser-radiation is selected by setting distances $d_1$ and $d_2$ during manufacture of the exemplary $CO_2$ laser. The inventive laser has an advantage that all component parts are common, regardless of the desired emission band.

Although laser 10 is depicted having a spectrally-selective element included in both resonator mirrors, in many instances sufficient spectral selectivity is achieved by having a spectrally-selective element included in only one of resonator mirrors 12 and 14. The inventors have determined that the resonators mirrors behave differently with respect to suppressing the other emission bands. They also determined that a protruding surface 36 on left resonator mirror 12 behaves similarly to a recessed surface 38 on right resonator mirror 14.

Figure 2:
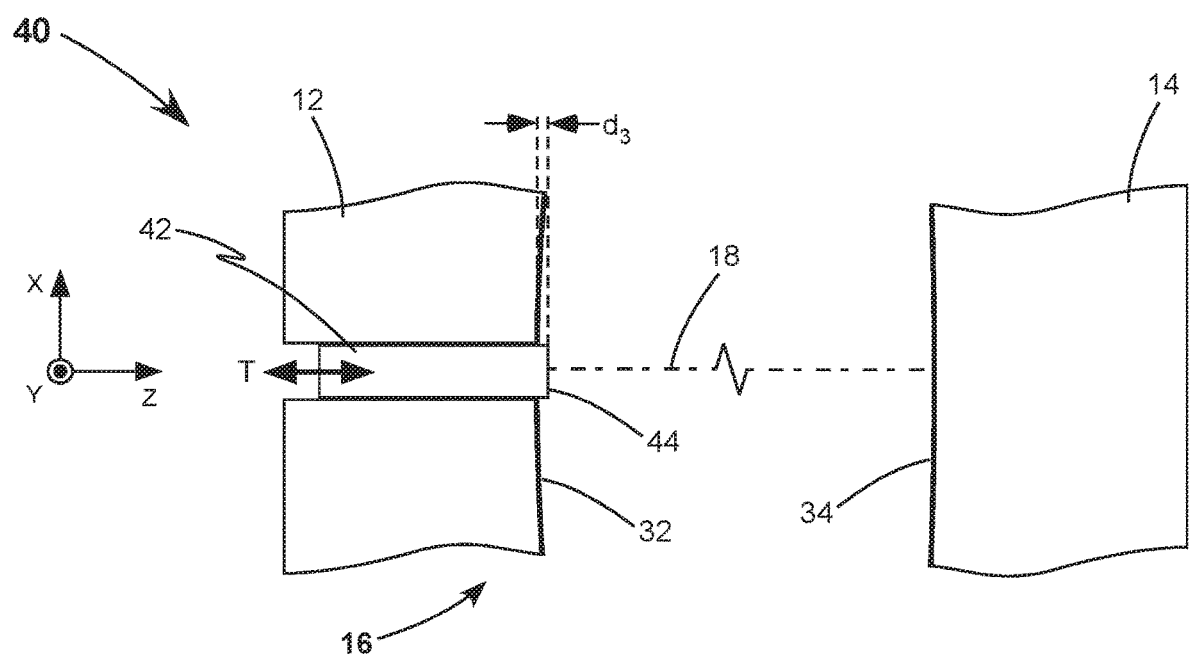
FIG. 2 is a plan view, in cross-section, schematically illustrating details of another embodiment of laser apparatus in accordance with the present invention, similar to the embodiment of FIG. 1C, but comprising just one spectrally-selective element that is translatable along the optical axis.

FIG. 2 is a plan view, in cross-section, schematically illustrating details of another embodiment of laser apparatus 40 in accordance with the present invention. Laser 40 is similar to laser 10 of FIG. 1C, with an exception that left resonator mirror 12 includes a spectrally-selective element 42 that is translatable along optical axis 18, as indicated by vector T. Spectrally-selective element 42 has a surface 44, which is reflective for a plurality of the emission bands of the gain-medium.

Translating spectrally-selective element 42 changes distance $d_3$, which is the distance surface 44 protrudes from or is recessed from surface 32. Spectrally-selective element 42 may be translated by a commercial micrometer, which could be actuated manually or could be motorized. Alternatively, spectrally-selective element 42 may be attached to a piezo-electric (PZT) element, with translation controlled by applying an electric potential. Means for precise linear translation of an optical element are well known in the art and further description thereof is not necessary for understanding the principles of the present invention. Distance $d_3$ may be set during manufacture of a laser or set during operation of a laser.

Figure 3:
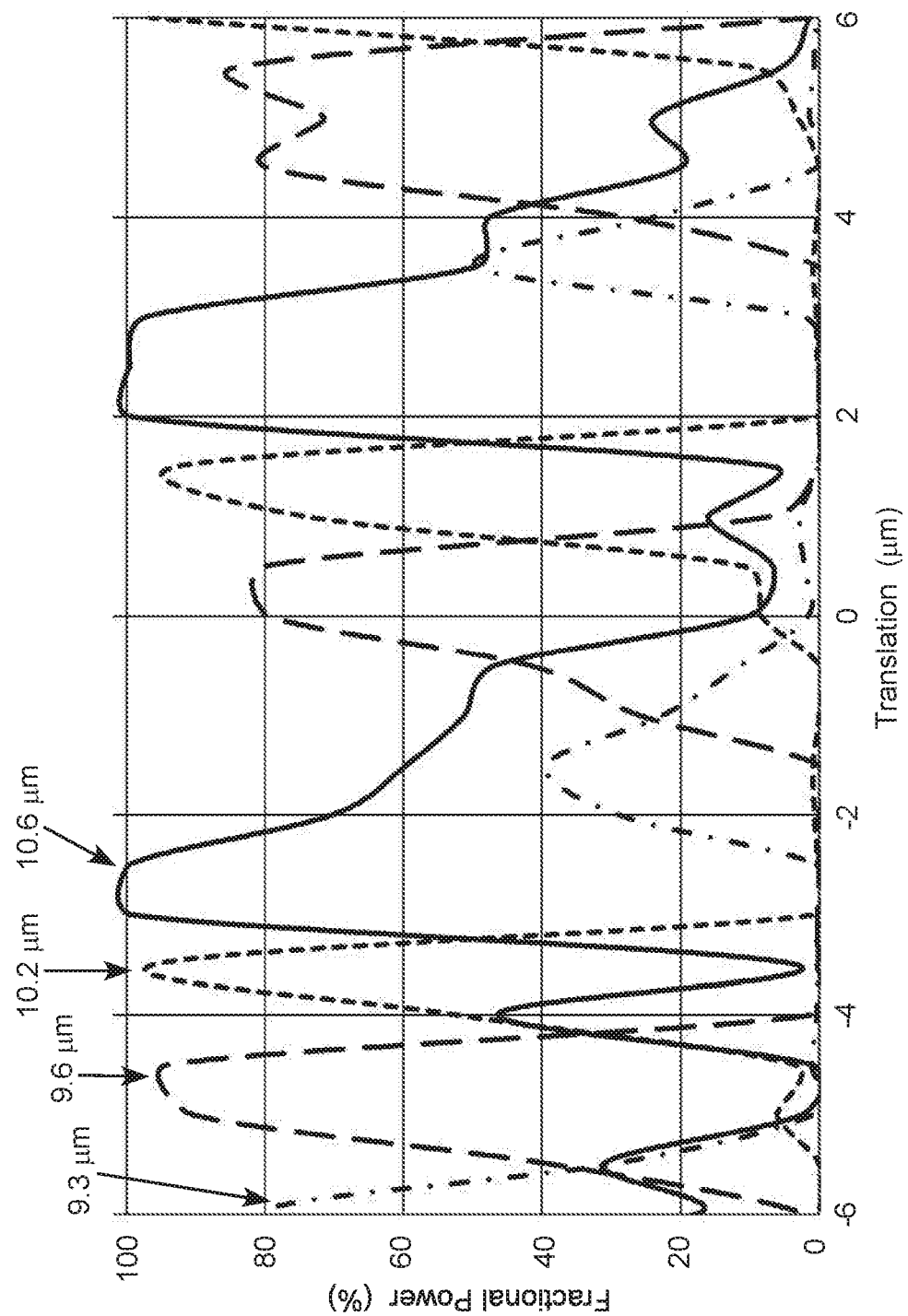
FIG. 3 is a graph schematically illustrating fractional power in four emission bands as a function of translation along the optical axis of the laser apparatus of FIG. 2, having a gain-medium that is a gas mixture and includes $CO_2$.

FIG. 3 is a graph depicting modeled fractional power in the four emission bands of the exemplary $CO_2$ laser described above as a function of translation along optical axis 18. An exemplary spectrally-selective element 42 is cylindrical in shape, has a flat surface 44, and a diameter of about 4 mm. Surfaces 32, 34, and 44 are highly reflective for all four emission bands. The model has emission cross-sections of $630 \times 10^{-12}$ m$^2$ at 9.3 µm, $650 \times 10^{-12}$ m$^2$ at 9.6 µm, $670 \times 10^{-12}$ m$^2$ at 10.2 µm, and $750 \times 10^{-12}$ m$^2$ at 10.6 µm. It should be noted that fractional powers appearing to exceed 100% are an artifact of generating the graph and actually represent fractional powers of about 100% in the model. It should also be noted that the numerical values for translation in the graph are displacements from an arbitrary location on optical axis 18, but these values correspond to relatively small distances $d_3$.

Constructive interference occurs between laser-radiation reflected from surfaces 32 and 44 whenever distance $d_3$ is about equal to a half-integer of the center wavelength of one of the four emission bands. In this condition, output laser-radiation from laser-resonator 16 is predominantly in that emission band, while other emission bands are suppressed. For example, most of the output power is in the 9.6 µm emission band at translations of about −4.5 µm and 0.3 µm. Similarly, most of the output power is in the 10.2 µm emission at a translation about −3.5 µm and 1.6 µm. The 9.3 µm emission band has the lowest emission cross-section and in this example never exceeds 80% of the fractional power. FIG. 3 demonstrates that laser 40 can be effectively tuned between the emission bands when required in an application.

Figure 4:
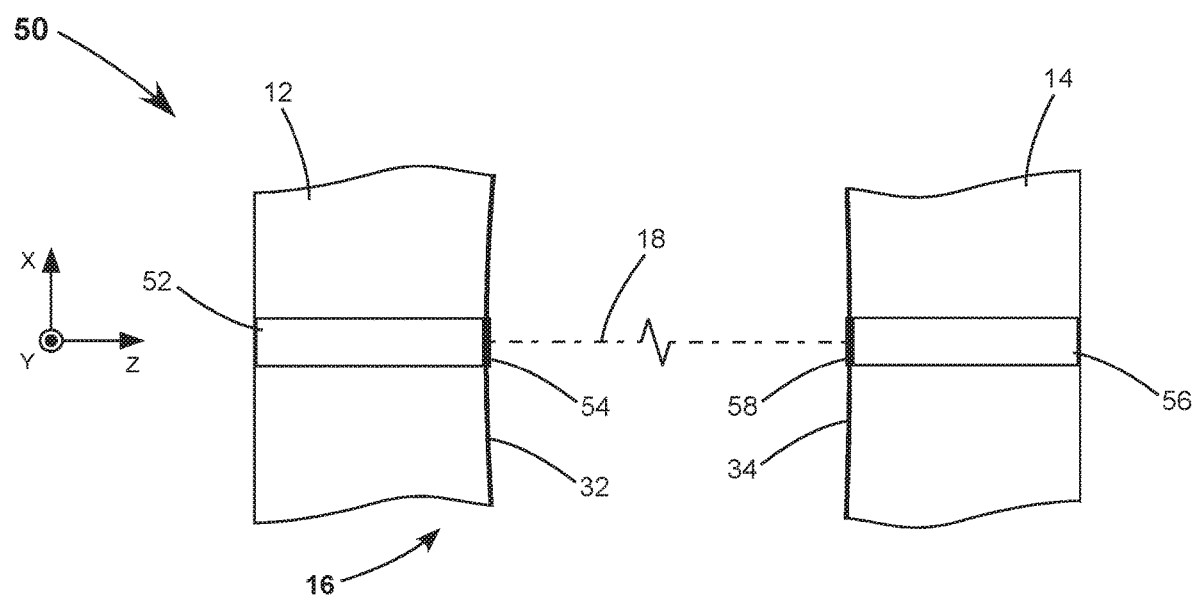
FIG. 4 is a plan view, in cross-section, schematically illustrating details of yet another embodiment of laser apparatus in accordance with the present invention, similar to the embodiment of FIG. 1C, but comprising two spectrally-selective mirrors located on the optical axis.

FIG. 4 is a plan view, in cross-section, schematically illustrating details of yet another embodiment of laser apparatus 50 in accordance with the present invention. Laser 50 is similar to laser 10 of FIG. 1C, with an exception that left resonator mirror 12 includes a spectrally-selective mirror 52 having a spectrally-selective coating 54 and right resonator mirror 14 includes a spectrally-selective mirror 56 having a spectrally-selective coating 58. Spectrally-selective coatings 54 and 58 have low reflection loss for the desired emission band. For each of the other emission bands, at least one of the spectrally-selective coatings has high reflection loss.

Spectrally-selective mirrors 52 and 56 suppress the other emission bands without protruding from or recessing from surfaces 32 and 34 of the resonator mirrors. However, they may also be arranged to be protruding or recessed to enhance spectral selectivity, as the other embodiments. The distances between the coated surfaces of the spectrally-selective mirrors and the surfaces of the resonator mirrors is selected to minimize the loss for the desired emission band and to further suppress the other emission bands.

Spectrally-selective mirrors 52 and 56 may have flat surfaces as depicted, may have surfaces having the same curvature as the resonator mirrors, or different surface curvatures. The surface curvatures may be selected to form a stable laser-resonator between the spectrally-selective mirrors. The stable laser-resonator would generate laser-radiation predominantly in the desired emission band, which leaks by diffraction into the unstable laser-resonator formed by resonator mirrors 12 and 14. The stable laser-resonator thereby effectively seeds the unstable laser-resonator with laser-radiation in the desired emission band.

Laser 50 is more reliable than prior-art designs having spectrally-selective coatings covering the whole surface of each resonator mirror. In laser 50, spectrally-selective mirrors 52 and 56 occupy a relatively small portion of the surface area of resonator mirrors 12 and 14 illuminated by the laser-radiation. Preferably, the small portion of the irradiated surface area should be less than 15% and most preferably 5%. For the exemplary $CO_2$ laser described above, exemplary spectrally-selective mirrors 52 and 56 are circularly shaped, having a diameter of about 4 mm. The spectrally-selective surfaces occupy about 2% of the total irradiated surface area of the resonator mirrors, thereby reducing risk for particle-induced optical damage commensurately compared to prior-art designs. An additional advantage of having spectrally-selective coatings on just a small portion of the resonator mirror surfaces is less overall heating thereof. Spectrally-selective coatings are more absorbing than thinner broad bandwidth coatings. Although laser 50 is depicted having a spectrally-selective element included in both resonator mirrors, in many instances sufficient spectral selectivity is achieved by having a spectrally-selective element included in only one of the resonator mirrors, thereby further reducing cost and risk for optical damage.

Figure 5A:
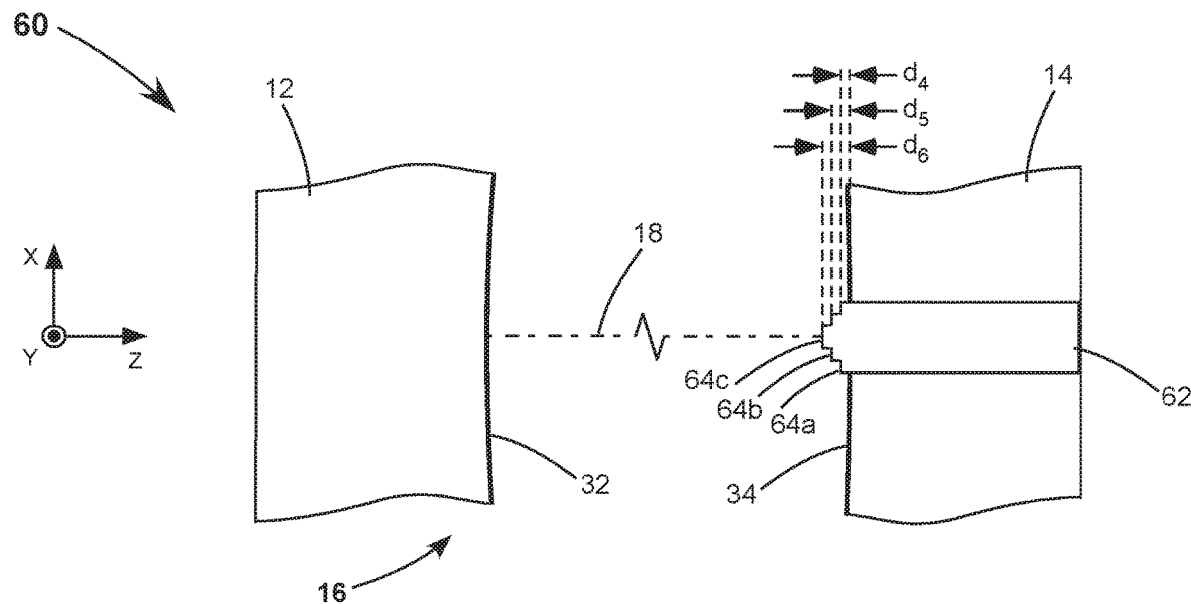
FIG. 5A is a plan view, in cross-section, schematically illustrating details of yet another embodiment of laser apparatus in accordance with the present invention, similar to the embodiment of FIG. 1C, but comprising just one spectrally-selective element in the form of a plurality of stepped surfaces that are concentric with the optical axis.
Figure 5B:
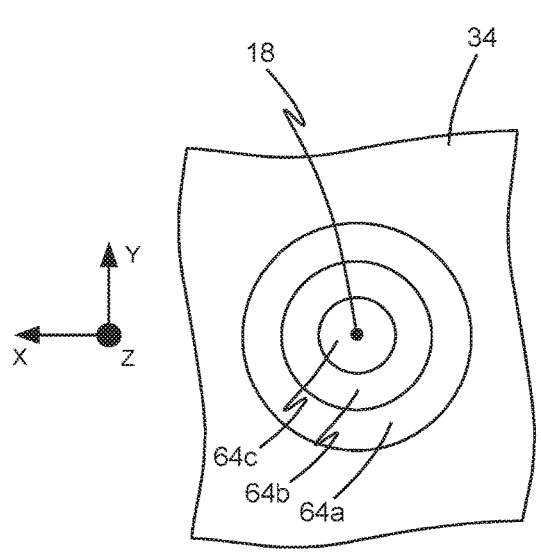
FIG. 5B is an end view and FIG. 5C is a side view, in cross-section, schematically illustrating additional details of the laser apparatus of FIG. 5A.

FIG. 5A is a plan view, in cross-section, schematically illustrating details of still another embodiment of laser apparatus 60 in accordance with the present invention. Laser 60 is similar to laser 10 of FIG. 1C, with an exception that right resonator mirror 14 includes a spectrally-selective structure 62 having a plurality of stepped surfaces (here, three) protruding from surface 34, which are concentric with optical axis 18. Surface 64a protrudes by distance $d_4$, surface 64b protrudes by distance $d_5$, and surface 64c protrudes by distance $d_6$. Distances $d_4$, $d_5$, and $d_6$ are about equal to different half-integers of the center wavelength of the desired emission band. FIG. 5B is an end view (facing surface 34) and FIG. 5C is a side view (in cross-section) schematically illustrating further details of laser 60.

The principle of operation of spectrally-selective structure 62 is the same as spectrally-selective elements 24 and 26 of FIG. 1C, whereby for the desired emission band there is constructive interference between laser-radiation reflected from surfaces 34, 64a, 64b, and 64c. For radiation in other emission bands, specular reflections from these surfaces will be out of phase. Instead, reflected radiation is diffracted away from optical axis 18 and thereby lost from laser-resonator 16 without significant amplification. Spectrally-selective structure 62 is more effective at suppressing the other emission bands than spectrally-selective elements 24 and 26 of FIG. 1C.

Spectral selectivity may be further improved by including a spectrally-selective coating on surfaces 36 and 38 or stepped surfaces 64a, 64b, and 64c. Distances $d_1$, $d_2$, $d_4$, $d_5$, and $d_6$ are rather small, for example in a range between 1 µm and 10 µm, so designs using multi-layer dielectric coatings must account for the penetration depth of laser-radiation into the coatings themselves.

Figure 5C:
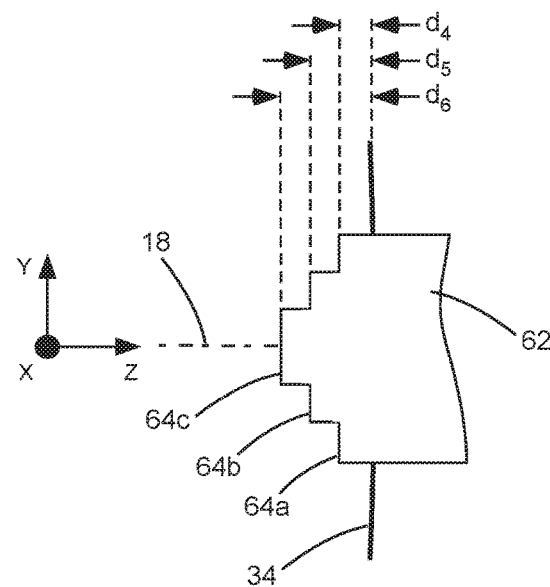

A spectrally-selective structure may be included in right resonator mirror 14 as depicted in FIGS. 5A-5C or in left resonator mirror 12. The stepped surfaces of the spectrally-selective structure may protrude from or be recessed from the surface of the respective resonator mirror. The inventors have determined that a configuration having a protruding structure on the left resonator mirror is favorable for suppressing emission bands that are longer in wavelength than the desired emission band. In contrast, a configuration having a recessed structure on the left resonator mirror or a protruding structure on the right resonator mirror favors suppression of shorter-wavelength emission bands.

Figure 6A:
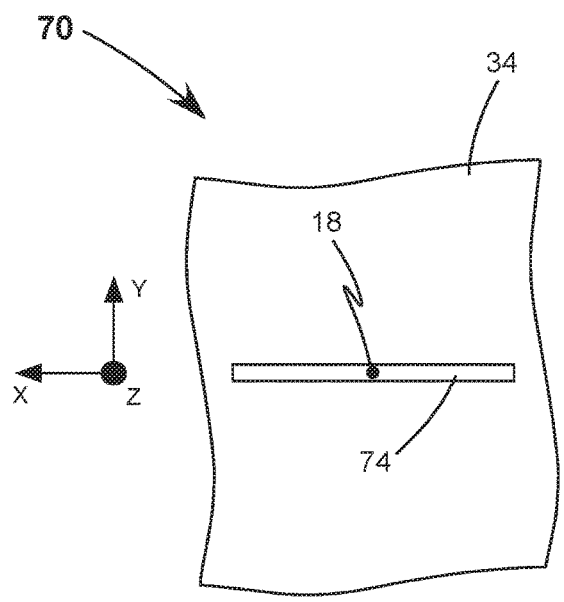
FIG. 6A is an end view and FIG. 6B is a side view, in cross-section, schematically illustrating details of still another embodiment of laser apparatus in accordance with the present invention, similar to the embodiment of FIGS. 5A-5C, but having a spectrally-selective element in the form of a protruding rectangular surface.
Figure 6B:
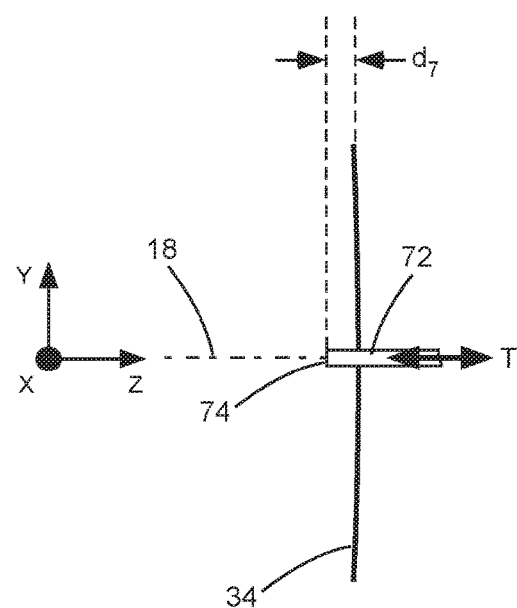

FIG. 6A is an end view (facing surface 34) and FIG. 6B is a side view (in cross-section) schematically illustrating details of still another embodiment of laser apparatus 70 in accordance with the present invention. Laser 70 is similar to laser 60 of FIGS. 5A-5C, but has a spectrally-selective structure 72 in the form of a rectangular surface 74 protruding by distance $d_7$ from surface 34. Spectrally-selective structure 72 is much wider in the XZ plane of the unstable laser-resonator than it is tall in the YZ plane. For the exemplary $CO_2$ laser described above, an exemplary spectrally-selective structure 72 is about 4 mm wide and about 0.2 mm high. Laser 70 has an advantage over laser 60 of being less alignment-sensitive for the unstable laser-resonator, i.e. for rotation about an axis in direction Y. Laser 70 can be tuned between emission bands by translating spectrally-selective structure 72 along optical axis 18, as indicated by vector T.

Figure 7A:
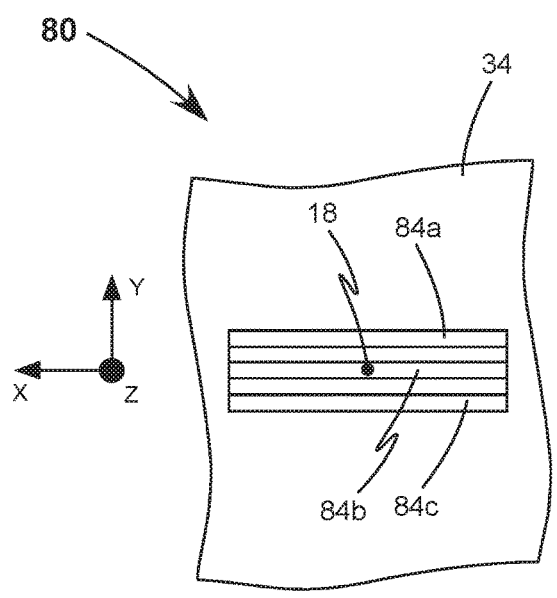
FIG. 7A is an end view and FIG. 7B is a side view, in cross-section, schematically illustrating details of still another embodiment of laser apparatus in accordance with the present invention, similar to the embodiment of FIGS. 6A and 6B, but having a plurality of parallel protruding rectangular surfaces.
Figure 7B:
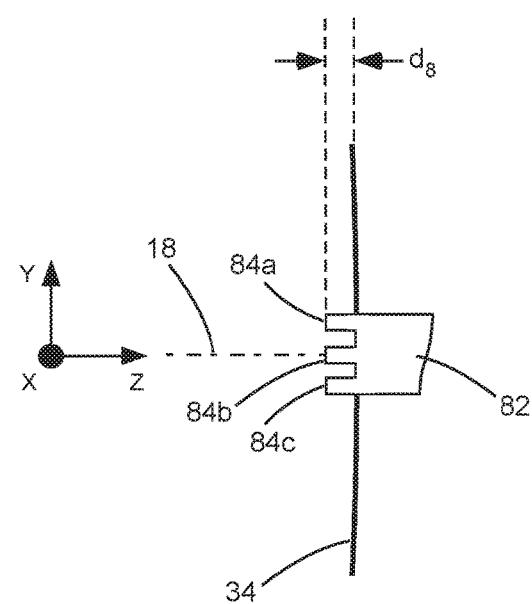

FIG. 7A is an end view (facing surface 34) and FIG. 7B is a side view (in cross-section) schematically illustrating details of still another embodiment of laser apparatus 80 in accordance with the present invention. Laser 80 is similar to laser 70 of FIGS. 6A and 6B, but has a spectrally-selective structure 82 in the form of a plurality of parallel rectangular surfaces (here, three) protruding from surface 34. Surfaces 84a, 84b, and 84c all protrude from surface 34 by distance $d_8$. Spectrally-selective structure 82 is more effective at suppressing the other emission bands than spectrally-selective structure 72 of FIGS. 6A and 6B. Although lasers 70 and 80 have rectangular protruding surfaces, alignment sensitivity for the unstable laser-resonator can be reduced using protruding surfaces having other elongated shapes, which are oriented in the plane of the unstable laser-resonator.

From the principles taught herein, those skilled in the art would recognize that other forms of spectrally-selective structure can be substituted for the embodiments presented, without departing from the spirit and scope of the present invention. For example, another form is an arrangement of stepped rectangular surfaces, arranged for constructive interference of radiation in the desired emission band reflected from each of the rectangular surfaces.

Figure 8A:
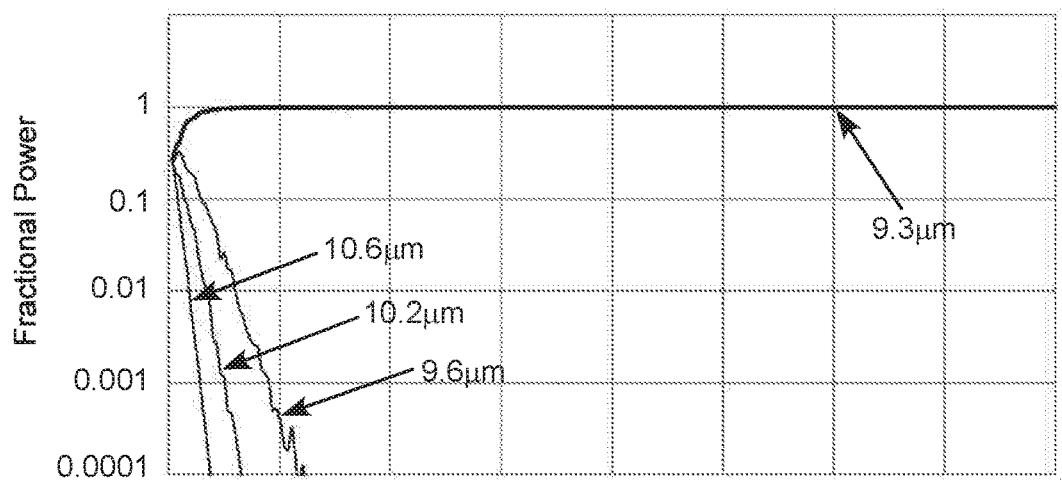
FIGS. 8A, 8B, and 8C are graphs of modeled fractional power in four emission bands as a function of time, comparing spectral selectivity for a prior-art laser and two lasers in accordance with present invention.
Figure 8B:
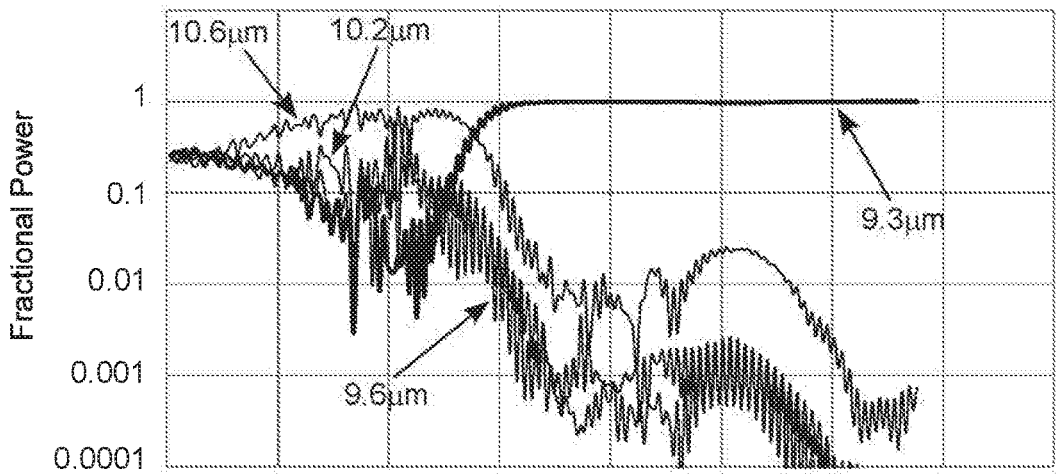
Figure 8C:
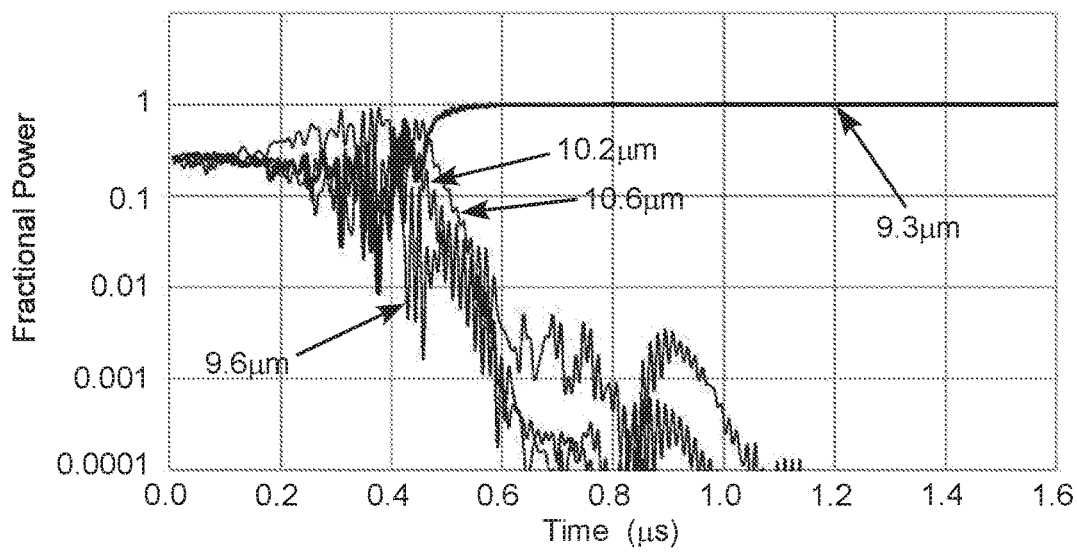

FIGS. 8A-8C are graphs depicting modeled fractional power in emission bands of a $CO_2$ gas mixture as a function of time. FIGS. 8A-8C are all drawn to the same time scale, which corresponds to a few hundred roundtrips of radiation in the laser-resonator. FIG. 8A is for a prior-art design having resonator mirrors coated entirely with spectrally-selective coatings for the desired emission band, which is here the 9.3 µm emission band. Both mirrors have 100% reflectivity at 9.3 µm. One resonator mirror coating has 75% reflectivity at 9.6 µm. The other resonator mirror coating has 60% reflectivity at 10.2 µm and 40% reflectivity at 10.6 µm. Stable operation in the desired 9.3 µm emission band is established after a small number of roundtrips in the laser-resonator.

FIG. 8B is for laser 60 of FIGS. 5A-5C, wherein spectrally-selective structure 62 has four stepped surfaces protruding from surface 34, with the stepped surfaces arranged to selectively reflect the desired 9.3 µm emission band. The overall diameter of the spectrally-selective structure is about 0.87 mm. All these surfaces have high reflectivity for all of the emission bands. FIG. 8B illustrates that laser 60 is capable of substantially exclusive and stable operation in the desired emission band, without having any expensive and damage-prone spectrally-selective coatings.

FIG. 8C is for laser 50 of FIG. 4, having highly reflective surfaces 32 and 34. Spectrally-selective mirrors 52 and 56 are each centered on optical axis 18 and have a diameter of 4 mm, corresponding to about 2% of the irradiated area of the resonator mirrors. Spectrally-selective coatings 54 and 58 have 100% reflectivity for the desired 9.3 µm emission band. Coating 54 has 75% reflectivity at 9.6 µm, 100% reflectivity at 10.2 µm, and 100% reflectivity at 10.6 µm. Coating 58 has 100% reflectivity at 9.6 µm, 60% reflectivity at 10.2 µm, and 40% reflectivity at 10.6 µm. These coating properties make laser 50 of FIG. 8C and the prior-art laser of FIG. 8A directly comparable. FIG. 8C illustrates that laser 50 is capable of exclusive and stable operation in the desired emission band, but with the spectrally-selective coatings covering just a small portion of the surface area of the resonator mirrors illuminated by laser-radiation.

Figure 9:
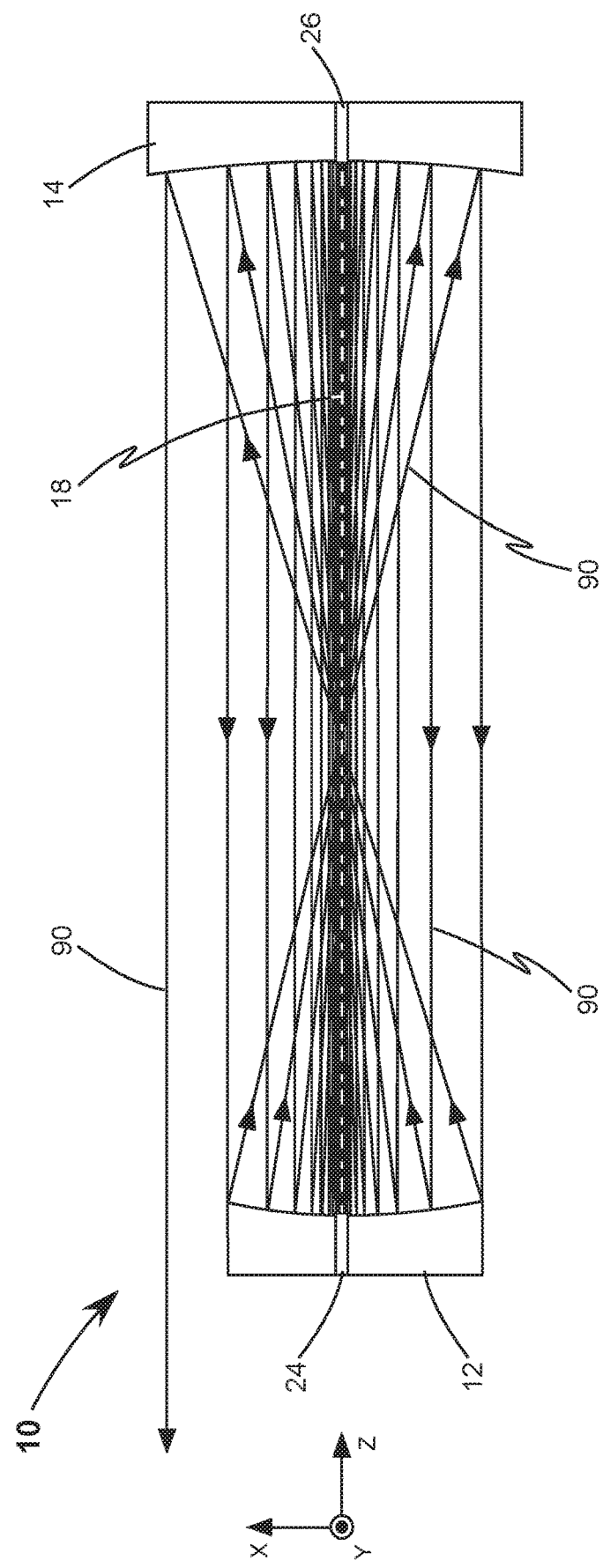
FIG. 9 is a plan view, in cross section, schematically illustrating propagation of a ray being amplified in the unstable laser-resonator of FIG. 1A.

FIG. 9 is a plan view, in cross-section, schematically illustrating propagation of a ray 90 in the unstable laser-resonator of laser 10 of FIG. 1A. Laser 10 has a configuration known as a "negative-branch unstable resonator" by practitioners of the art. Ray 90 is generated by spontaneous emission in the energized gain-medium at a location proximate to optical axis 18, which is depicted here as a white broken line for clarity of illustration. Ray 90 initially propagates almost parallel to the optical axis, thereafter following a serpentine path between resonator mirrors 12 and 14, eventually exiting the laser-resonator after a last reflection from a location towards an outside edge of right resonator mirror 14. Ray 90 is amplified by stimulated emission during each pass through the energized gain-medium. Arrows indicate the propagation direction of ray 90 during the last few passes.

FIG. 9 illustrates a characteristic of such an unstable resonator utilized in the present invention, that rays originating proximate to the optical axis are reflected from each resonator mirror many times, with a high density of reflections close to the optical axis. These rays become highly amplified. In contrast, any rays originating away from the optical axis would make no more than a few passes through the laser-resonator and would only be weakly amplified. A small area on each resonator-mirror close to the optical axis, therefore, has a large influence on the behavior of the laser-resonator and is a favorable location for a spectrally-selective element, spectrally-selective coating, or spectrally-selective structure.

Returning to FIG. 3, exemplary flat surface 44 of spectrally-selective element 42 and surface 34 of resonator mirror 14 cooperatively form a stable laser-resonator that seeds the unstable laser-resonator, in the manner described above. The tuning between emission bands depicted is a function of both the translation of the spectrally-selective element and the seeding provided by the stable laser-resonator. In general, forming a stable laser-resonator on the optical axis of the unstable laser-resonator improves spectral purity in the desired emission band obtained using any of the spectrally-selective elements presented. Operation of such a stable resonator is sensitive to the precise surface shape of each spectrally-selective element. Indeed, spectral selectivity is sensitive to the precise shape of any reflective surface proximate to the optical axis of the unstable laser-resonator.

A spectrally-selective element causing a reflection loss of greater than 10% is sufficient in many instances to suppress lasing in other emission bands of the gain-medium. A reflection loss of greater than 20% is preferable for the most-reliable continuous operation in the desired emission band.

The present invention can be applied to CO lasers operating between 4.5 µm and 6.0 µm, even though CO laser-emission occurs via a cascade process that has one broad emission band. A problem for CO lasers is spurious emission by $CO_2$ molecules in a nominally CO gas mixture, which occurs in the $CO_2$ emission bands between 9 µm and 11 µm. Band-selective elements can be used to suppress the $CO_2$ emission bands in a CO laser.

Although the embodiments presented have spectrally-selective elements and structures in forms that are inserted into the resonator mirrors, these structures can be formed in the resonator mirrors themselves, without departing from the spirit and scope of the present invention. For example, the structures may be machined directly into the resonator mirrors during fabrication thereof. Similarly, spectrally-selective coatings may be grown directly on a portion of the resonator mirror surfaces.

The present invention is described above in terms of a preferred embodiment and other embodiments. The invention is not limited, however, to the embodiments described and depicted herein. Rather, the invention is limited only by the claims appended hereto.

What is claimed is:

1. Laser apparatus, comprising:
a gain-medium having a plurality of emission bands;
first and second resonator mirrors, each resonator mirror having a reflective surface, the resonator mirrors arranged around the gain-medium to form an unstable laser-resonator, the unstable laser-resonator having an optical axis;
wherein the second resonator mirror includes a spectrally-selective element, the spectrally-selective element occupying a less than 30% portion of the reflective surface of the second resonator mirror, the spectrally-selective element located on the optical axis, the spectrally-selective element having a reflection loss of less than about 4% for a desired emission band and a reflection loss of greater than 10% for other emission bands;
wherein the first resonator mirror and the spectrally-selective element form a stable laser-resonator on the optical axis of the unstable laser-resonator, the stable laser-resonator generating laser-radiation predominantly in the desired emission band, laser-radiation generated by the stable-resonator leaking into the unstable laser-resonator, thereby seeding the unstable laser-resonator; and
wherein energizing the gain-medium produces laser-radiation from the unstable laser-resonator having higher power in the desired emission band than in the other emission bands.

2. The laser of claim 1, wherein the gain-medium is a gas mixture that includes carbon dioxide.

3. The laser of claim 1, wherein the gain-medium is a gas mixture that includes carbon monoxide.

4. The laser of claim 1, wherein the reflection loss for the other emission bands is greater than about 20%.

5. The laser of claim 1, wherein the spectrally-selective element occupies a less than 15% portion of the reflective surface of the second resonator mirror.

6. The laser of claim 5, wherein the spectrally-selective element occupies a less than 5% portion of the reflective surface of the second resonator mirror.

7. The laser of claim 1, wherein the spectrally-selective element protrudes from or is recessed from other portions of the reflective surface of the second resonator mirror.

8. The laser of claim 7, wherein the desired emission band is selected by setting a distance that spectrally-selective element protrudes or is recessed.

9. The laser of claim 8, wherein the desired emission band has a center wavelength, the distance that the spectrally-selective element protrudes or is recessed is about equal to a half-integer of the center wavelength.

10. The laser of claim 8, wherein spectrally-selective element is translated along the optical axis, changing the distance that the spectrally-selective element protrudes or is recessed, thereby tuning the laser-radiation between the emission bands.

11. The laser of claim 7, wherein the spectrally-selective element is inserted into the second resonator mirror.

12. The laser of claim 7, wherein the spectrally-selective element is machined into the second resonator mirror during the fabrication thereof.

13. The laser of claim 1, wherein another spectrally-selective element is in the first resonator mirror.

14. The laser of claim 1, wherein the spectrally-selective element has a flat reflecting surface.

15. The laser of claim 1, wherein the spectrally-selective element has curved reflecting surface.

16. The laser of claim 1, wherein the spectrally-selective element is a spectrally-selective mirror having a spectrally-selective coating.

17. The laser of claim 1, wherein the spectrally-selective element is a spectrally-selective coating grown on the less than 30% portion of the second resonator mirror.

18. The laser of claim 1, wherein the spectrally-selective element is a structure having a plurality of stepped surfaces.

19. The laser of claim 18, wherein the stepped surfaces are concentric with the optical axis.

20. The laser of claim 18, wherein the stepped surfaces are rectangular in shape.

21. The laser of claim 18, wherein the desired emission band has a center wavelength, each of the stepped surfaces protrudes from or is recessed from other portions of the reflective surface by a distance, the distance being about equal to a half-integer of the center wavelength.

22. The laser of claim 1, wherein the spectrally-selective element is in the form of an elongated surface that protrudes from or is recessed from other portions of the reflective surface.

23. The laser of claim 22, wherein the elongated surface is oriented in a plane of the unstable laser-resonator.

24. The laser of claim 22, wherein the elongated surface is rectangular in shape.

25. The laser of claim 1, wherein the unstable laser-resonator is a negative-branch unstable resonator.

26. The laser of claim 1 wherein the spectrally-selective element has a diameter ranging from slightly less than one millimeter to a few millimeters.

* * * * *